(12) United States Patent
Kremer

(10) Patent No.: US 6,463,959 B2
(45) Date of Patent: Oct. 15, 2002

(54) PRESSURE CONTROL VALVE

(75) Inventor: Eugen Kremer, Bühl (DE)

(73) Assignee: LuK Lamellen und Kupplungsbau Beteiligungs KG, Buhl/Baden (DE)

(*) Notice: Subject to any disclaimer, the term of this patent is extended or adjusted under 35 U.S.C. 154(b) by 0 days.

(21) Appl. No.: 09/774,995

(22) Filed: Jan. 31, 2001

(65) Prior Publication Data

US 2001/0015229 A1 Aug. 23, 2001

(30) Foreign Application Priority Data

Feb. 10, 2000 (DE) .......................... 100 05 834

(51) Int. Cl.[7] .............................. F15B 13/042

(52) U.S. Cl. ................. 137/625.66; 91/433; 192/109 F

(58) Field of Search ..................... 91/433; 137/625.66; 192/109 F

(56) References Cited

U.S. PATENT DOCUMENTS 3,583,422 A * 6/1971 Dach et al. ............... 91/433 X
5,058,626 A * 10/1991 Takaoka et al. ....... 137/625.66

FOREIGN PATENT DOCUMENTS

DE  198 20 389 A 1  11/1998

* cited by examiner

Primary Examiner—Gerald A. Michalsky
(74) Attorney, Agent, or Firm—Darby & Darby

(57) ABSTRACT

A pressure control valve under the control of a pilot pressure generates a working pressure for a pressure-actuated apparatus. The valve has a control piston with two piston elements of different diameter. A working-pressure chamber is confined between the two piston elements, and a pilot-pressure chamber is confined between one of the control-piston elements and an additional piston. The additional piston takes a position dependent on a momentarily existing difference between the working pressure and the pilot pressure and, through an elastic force-coupler device, applies a position-dependent force to the control piston.

5 Claims, 1 Drawing Sheet

PRESSURE CONTROL VALVE

BACKGROUND OF THE INVENTION

The invention relates to a pressure control valve that serves to generate a variable working pressure for actuating a device such as the start-up clutch of a motor vehicle, where the variation of the working pressure is effected by a controlling pressure, e.g., a pilot pressure, while the supply pressure delivered to the pressure control valve by a pressure source, for example a pump, remains constant.

The functional dependency between the pilot pressure and the working pressure is subject to a diversity of requirements. For example, in the engagement phase of a start-up clutch, a change in the pilot pressure should at first cause only a small change in the working pressure in order to allow a precise control of the working pressure. However, with a continued increase in the pilot pressure, the working pressure should increase at a steeper rate to ensure that the clutch is securely engaged and works in a slip-free or at least substantially slip-free manner.

This kind of a progressive pressure control characteristic can be realized, e.g., with the known pressure control valve according to DE 198 20 389 A1, which has a control piston coaxially surrounded by an outer piston with at least three radial openings. The pressure control valve has connector conduits, one of which introduces the working pressure to the control piston in such a manner that the control piston moves in opposition to the combined forces of a spring and the pilot pressure. A further conduit performs the function of applying the pilot pressure to the outer piston. When a certain threshold value of the pilot pressure is exceeded, the outer piston will move in opposition to the force of another spring, whereby the aforementioned spring force that opposes the movement of the control piston is increased. As a result, the gradient slope of the working pressure in function of the pilot pressure is increased, so that the pressure control valve has a correspondingly non-linear characteristic.

The pressure control valve of the foregoing description suffers from the drawback of a relatively complex design and requires a comparatively complicated manufacturing process.

OBJECT OF THE INVENTION

It is therefore the object of the present invention to provide a pressure control valve of a less complicated design, in which a desired functional relationship between pilot pressure and working pressure can be achieved through an appropriated choice of dimensions, in particular for providing the pressure control valve with a progressive characteristic where the working pressure as a function of the pilot pressure rises at a steeper gradient in that part of the characteristic where the pilot pressure is high than in the part where the pilot pressure is low.

SUMMARY OF THE INVENTION

According to the invention, the foregoing objective is met by a pressure control valve with a working-pressure chamber and a pilot-pressure chamber. The working-pressure chamber receives a supply pressure from a pressure source by way of a supply-pressure port and a throttle passage and delivers a working pressure to a pressure-actuated apparatus by way of a working-pressure port. The pilot-pressure chamber receives a pilot pressure from a pilot-pressure control device. The working-pressure chamber is axially confined between two piston elements of a control piston, and the pilot-pressure chamber is axially confined between one of the control-piston elements and an additional piston. In the presence of a constant supply pressure, the working pressure generated at the working-pressure port varies as a function of the pilot pressure. The additional piston takes a position dependent on a momentarily existing difference between the working pressure and the pilot pressure and, through an elastic force-coupler device, applies a position-dependent force to the control piston. In addition, the valve has one or more drain ports.

Preferably, the aforementioned force-coupler device is designed as a coupler spring arranged in such a manner that one end of the spring acts against the additional piston while the other end of the spring acts against the control piston.

In a further developed embodiment of the invention, the additional piston is elastically biased into a rest position and connected to the working pressure in such a way that the additional piston will leave the rest position only when the working pressure exceeds the pilot pressure by a predetermined amount.

In an embodiment that includes the aforementioned coupler spring as well as the elastic biasing of the additional piston, it is advantageous if the coupler spring is in a force-free state when the additional piston is in the rest position.

The elastic biasing of the additional piston can be advantageously performed by a biasing spring.

In preferred embodiments of the invention, the housing of the pressure control valve has a cylindrical interior space divided into three cylinder-bore sections of different respective diameters arranged in order of diameter size from smallest to largest. The first piston element of the control piston runs inside the first and narrowest cylinder-bore section, while the second piston element runs in the second, i.e. intermediate, cylinder-bore section and the additional piston runs in the third, i.e. widest, cylinder-bore section. As described above, the working-pressure chamber is confined between the first and second piston elements, and the pilot-pressure chamber is confined between the second piston element and the additional piston.

With the arrangement of three cylinder-bore sections as just described, it is advantageous if the drain port is located in the intermediate cylinder-bore section.

In design arrangements where the pressure control valve has three cylinder-bore sections, it is further advantageous if the supply-pressure port is arranged to enter the valve in the area of the first cylinder-bore section at a place occupied by the first piston element. The aforementioned throttle passage from the supply-pressure port to the working-pressure chamber can be designed as a narrow gap between the circumference of the first piston element and the inside cylinder wall of the first cylinder-bore section.

In a further preferred embodiment, the pressure control valve according to the invention has a dead-end chamber on the side of the first piston element that faces away from the working-pressure chamber. The dead-end chamber is open to an additional drain port. The aforementioned narrow gap between the first piston element and the housing now throttles the fluid flow from the supply-pressure port in both directions, i.e., into the working-pressure chamber as well as into the dead-end chamber.

The pressure control valve according to the present invention is distinguished by a comparatively simple design and by its adaptability to diverse requirements. By appropriate dimensioning of the two springs and of the effective pressure-bearing surfaces of the pistons, it is possible to achieve a desired valve characteristic, i.e., a desired functional relationship between the pilot pressure and the working pressure.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

In the following detailed description, examples of embodiments of the invention are discussed on the basis of the attached drawing in which.

DETAILED DESCRIPTION OF PREFERRED EMBODIMENTS

Figure 1:
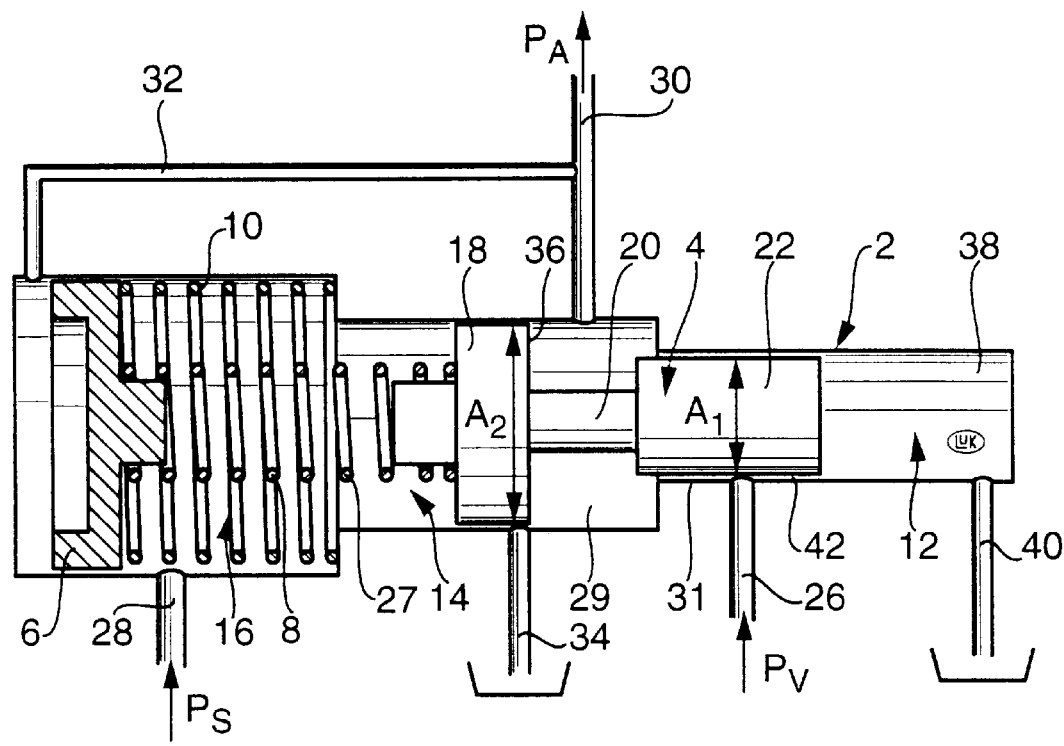
FIG. 1 represents a schematic cross-sectional view of a pressure control valve according to the invention.

In accordance with FIG. 1, the pressure control valve has five essential components: a housing 2, a control piston 4, an additional piston 6, a coupler spring 8, and a biasing spring 10.

The housing overall encloses a cylindrical space with three coaxial cylinder-bore sections 12, 14, 16 lying adjacent to each other. The section 12 on the right of FIG. 1 has a smaller diameter, and the section 16 on the left has a larger diameter than the section 14 in the middle.

The control piston 4 has a second piston element 18 guided in the bore section 14 with essentially fluid-tight wall contact. The second piston element 18 is connected by way of a shaft 20 to a first piston element 22 that moves with a small amount of wall clearance inside the bore section 12. The additional piston 6, whose overall shape resembles a hat, is guided in the bore section 16 with essentially fluid-tight wall contact.

In the travel range of the first piston element 22, the cylinder-bore section 12 has a supply-pressure port 26 receiving pressure medium, preferably hydraulic fluid, that is pressurized with a supply pressure $p_V$. The pressure may be generated, e.g., by a pump delivering fluid at a high and preferably constant pressure level.

The portion of the cylinder-bore section 16 between the additional piston 6 and the control piston 4 forms a pilot-pressure chamber 27 with a pilot-pressure port 28 receiving pressure medium at a pilot pressure $p_S$. The pilot pressure $p_S$ can be considerably smaller than the supply pressure.

The portion of the bore section 14 between the piston elements 18 and 22 forms a working-pressure chamber 29, where a working pressure $p_A$ is generated and delivered by way of the working-pressure port 30 to a pressure-actuated apparatus such as a vehicle clutch. A connector conduit 32 leads from the working-pressure port 30 to the far side of the cylinder-bore section 16, whereby the working pressure $p_A$ is applied to the side of the additional piston 6 that faces away from the control piston 4. The working-pressure chamber 29 is connected to the supply-pressure port 26 by way of a throttle passage 31 that is formed by the narrow gap between the first piston element 22 and the interior housing wall.

A first drain port 34 exits from the bore section 14. The aperture of the first drain port 34 is controlled by the position of the shutter edge 36 of the piston element 18, so that the width of the passage from the working-pressure chamber 29 through the first drain port 34 is controlled by the position of the control piston 4.

To the right of the first piston element 22 in the representation of FIG. 1, the valve housing has a dead-end chamber 38 with a second drain port 40. The dead-end chamber is connected to the supply port 26 by way of a throttle passage 42.

The biasing spring 10, which is seated against the step in the interior housing wall between the bore sections 14 and 16, is designed and dimensioned to urge the additional piston 6 with a biasing force to its home position on the left side of FIG. 1, where the additional piston 6 will rest against the end wall of the cylinder section 16, although FIG. 1 does not show the additional piston 6 in its home position.

The coupler spring 8, which is seated between the control piston 4 and the additional piston 6 is designed and dimensioned to be essentially force-neutral when the additional piston 6 is in the home position described above.

The pressure control valve works as follows:

The relationship between the working pressure $p_A$ and the pilot pressure $p_S$ is expressed through the equation $$p_A(A_2-A_1)=p_S A_2 \qquad (1)$$

where $A_2$ represents the effective aspect area of the second piston element 18 (equal to the cross-sectional area of the bore section 14) and $A_1$ represents the effective aspect area of the first piston element 22 (equal to the cross-sectional area of the bore section 12), with the assumption that the cross-sectional area of the shaft 20 has a negligible influence in comparison to the cross-sectional areas of the piston elements 18 and 22. The equilibrium represented by equation (1) is maintained by the cooperation between the shutter edge 36 and the first drain port 34 with very small movements of the control piston 4. Thus, the relationship between working pressure and pilot pressure is represented by the equation $$p_A=p_S k_1 \qquad (2)$$

where $k_1=A_2/(A_2-A_1)$

The foregoing equations (1) and (2) remain valid as long as the additional piston 6 is in its home position, i.e., as long as $$p_S < p_S^* = \frac{F}{A_3(k_1-1)},$$

wherein F represents the biasing force of the biasing spring, $A_3$ represents the cross-sectional area of the additional piston 6, and $p_S^*$ represents the threshold value of the pilot pressure $p_S$ at which the additional piston will overcome the biasing spring force F.

When the pressure difference $p_A-p_S$ produces a resultant force on the additional piston 6 that is greater than the biasing force of the biasing spring 10, the additional piston 6 is pushed more and more to the right, i.e., to a position as illustrated in FIG. 1. This causes the coupler spring 8 to apply an additional force to the control piston 4, which will have the same effect as if an additional amount of pilot pressure were acting on the control piston 4. As a result, the slope of $p_A$ as a function of $p_S$ becomes steeper.

When the additional piston is free from its rest position, the equilibrium of forces on the additional piston 6 and the control piston 4, respectively, is represented by the equations $$(p_A-p_S)A_{3-F+XC_1}+XC_2;$$

and $$p_A(A_2-A_1)=p_SA_2+XC_2,$$

wherein $C_1$ represents the spring constant of the biasing spring 10, $C_2$ represents the spring constant of the coupler spring 8, and X represents the decrease in the distance between the additional piston 6 and the control piston 4 (which is approximately equal to the displacement of the additional piston 6).

Figure 2:
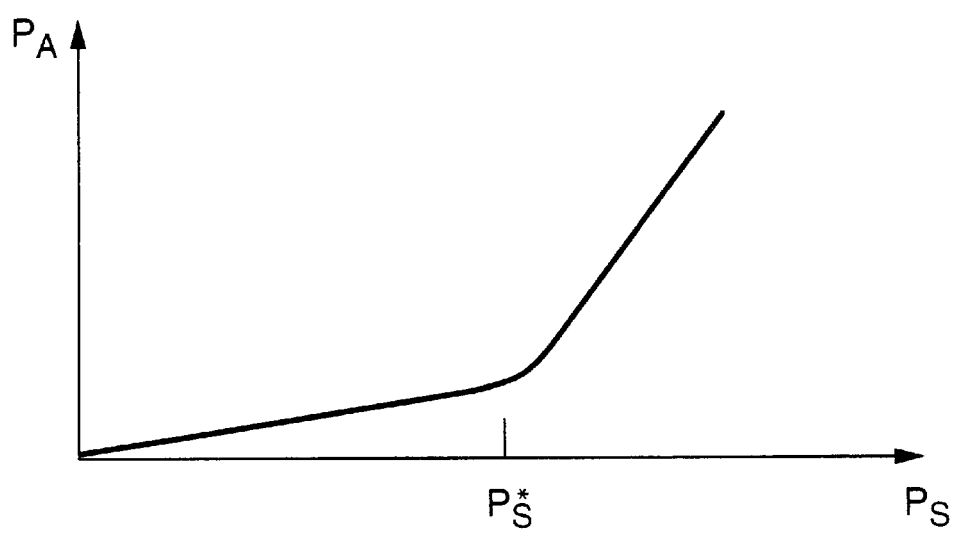
FIG. 2 represents an example of the functional dependency between the pilot pressure and the working pressure.

The preceding equations can be solved for $p_A$ in terms of $p_S$ and $p_S^*$, with the result $$p_A=p_S^*k_1+(p_S-p_S^*)k_2,$$

where $k_2$ is a constant. The last equation is illustrated by the graph of FIG. 2.

When the pilot pressure $p_S$ is smaller than $p_S^*$, the relationship between $p_A$ and $p_S$ is represented by the linear equation (2). When the pilot pressure $p_S$ reaches the threshold level $p_S^*$, i.e., at the point where the biasing force of the biasing spring 10 is matched by the resultant of the pressure forces on the additional piston, the coupler spring 8 begins to have an increasing effect and as a consequence, $p_A$ begins to increase at a steeper rate.

By selecting appropriate dimensions and force-displacement characteristics for the springs 8 and 10, it is possible to achieve a functional relationship between $p_A$ and $p_S$ where, after a transitional range around $p_S^*$ (in FIG. 2), the graph continues to the right at a linear rate of increase. Thus, the pressure control valve can be designed to essentially have a characteristic with two linear parts of different slope angle.

The dead-end chamber 38 allows the control piston 4 to move with minimal friction.

As is self-evident, the pressure control valve of the foregoing description can be modified in any number of ways. As an example, the connector conduit 32 could be integrated in the housing. Depending on different requirements, the diameter sizes of the cylinder-bore sections could be arranged in different order. For example, the requirements could call for the diameter sizes to increase from left to right in FIG. 1, or for the bore-sections to have equal diameters.

The throttle passages 31 and 42 can be designed with a small flow-passage cross-section, so that the pressure control valve works with a low level of leakage losses.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A pressure control valve, comprising:
a housing with a supply-pressure port adapted to receive a supply pressure from a pressure source, a pilot-pressure port adapted to receive a pilot pressure from a pilot-pressure control device, a working-pressure port adapted to provide a working pressure to a pressure-actuated apparatus, and a drain port;
a working-pressure chamber connected to the working-pressure port and, by way of a throttle passage, to the supply-pressure port;
a pilot-pressure chamber connected to the pilot pressure port;
a control piston having a first piston element, a second piston element, and a shaft connecting the first and second piston elements;
an additional piston;
a force-coupler device connecting the additional piston to the control piston;
a biasing spring, wherein the additional piston is elastically biased into a rest position by the biasing spring;
wherein the working-pressure chamber is confined between the first and second piston elements and the pilot-pressure chamber is confined between the second piston element and the additional piston, so that at a constantly supply pressure, the working pressure will vary as a function of the pilot pressure;
wherein further the additional piston takes a position dependent on a difference between the working pressure and the pilot pressure; and the force-coupler device applies to the control piston a force whose magnitude depends on said position of the additional piston;
wherein the additional piston will overcome the elastic bias and leave the rest position only when the working pressure exceeds the pilot pressure by a predetermined amount; and
wherein the force-coupler device comprises a coupler spring interposed between and acting against the additional spring and the control piston.

2. A pressure control valve comprising:
a housing with a supply-pressure port adapted to receive a supply pressure from a source, a pilot-pressure port adapted to receive a pilot pressure from a pilot-pressure control device, a working-pressure port adapted to provide a working pressure to a pressure-actuated apparatus, and a drain port;
a working-pressure chamber connected to the working-pressure port and, by way of a throttle passage, to the supply-pressure port;
a pilot-pressure chamber connected to the pilot pressure port;
a control piston having a first piston element, a second piston element, and a shaft connecting the first and second piston elements;
an additional piston;
a force-coupler device connecting the additional piston to the control piston;
wherein the working-pressure chamber is confined between the first and 'second piston elements and the pilot-pressure chamber is confined between the second piston element and the additional piston, so that at a constant supply pressure, the working pressure will vary as a function of the pilot pressure;
wherein further the additional piston takes a position dependent on a difference between the working pressure and the pilot pressure; and the force-coupler device applies to the control piston a force whose magnitude depends on said position of the additional piston; and wherein the housing has a cylindrical interior space comprising first, second and third cylinder-bore sections of different respective diameters arranged in order of diameter size from smallest to largest; wherein the control piston runs with the first piston element in the first cylinder-bore section and the second piston element in the second cylinder-bore section, the working-pressure chamber being confined between the first and second piston elements; and the additional piston runs in the third cylinder-bore section.

3. The pressure control valve of claim 2, wherein the drain port is located in the second cylinder-bore section.

4. The pressure control valve of claim 3, wherein the supply-pressure port enters the first cylinder-bore section at a place occupied by the first piston element, the throttle passage being constituted by a narrow gap between the first piston element and the housing.

5. The pressure control valve of claim 4, further comprising a dead-end chamber, an additional drain port exiting from said dead-end chamber, and an additional throttle passage constituted by the narrow gap between the first piston element and the housing, wherein the dead-end chamber and the working-pressure chamber are on opposite sides of the first piston element, the throttle passage and the additional throttle passage run in opposite directions from the supply-pressure port, the additional throttle passage connecting the supply-pressure port to the dead-end chamber.

* * * * *